(12) United States Patent
Thompson

(10) Patent No.: US 9,181,691 B2
(45) Date of Patent: Nov. 10, 2015

(54) QUICK CONNECT ANCHOR FOR POURED CONCRETE CEILINGS ON METAL OR WOOD DECKS

(71) Applicant: William J. Thompson, Las Vegas, NV (US)

(72) Inventor: William J. Thompson, Las Vegas, NV (US)

(*) Notice: Subject to any disclaimer, the term of this patent is extended or adjusted under 35 U.S.C. 154(b) by 0 days.

(21) Appl. No.: 14/664,301

(22) Filed: Mar. 20, 2015

(65) Prior Publication Data

US 2015/0275505 A1 Oct. 1, 2015

Related U.S. Application Data

(63) Continuation-in-part of application No. 14/225,019, filed on Mar. 25, 2014, now abandoned.

(51) Int. Cl.
| | |
|---|---|
| *F16L 3/00* | (2006.01) |
| *E04B 1/41* | (2006.01) |
| *E04F 19/00* | (2006.01) |

(52) U.S. Cl.
CPC ............ *E04B 1/4121* (2013.01); *E04B 1/4135* (2013.01); *E04F 19/00* (2013.01); *F16L 3/00* (2013.01)

(58) Field of Classification Search
CPC ............ E04B 1/21; E04B 2001/2418; E04B 2001/2652; E04B 1/40; E04B 1/41; E04B 1/4121; E04B 1/415
See application file for complete search history.

(56) References Cited

U.S. PATENT DOCUMENTS

| | | | |
|---|---|---|---|
| 3,019,865 A * | 2/1962 | Rohe | 52/787.12 |
| 3,352,341 A | 11/1967 | Schertz | |
| 4,083,393 A | 4/1978 | Okada | |
| 5,100,275 A | 3/1992 | Schirrmacher | |
| 5,427,488 A | 6/1995 | Fullerton et al. | |
| 5,468,105 A * | 11/1995 | Iwamoto | 411/433 |
| 6,240,697 B1 * | 6/2001 | Thompson et al. | 52/698 |
| 6,361,260 B1 * | 3/2002 | Schirrmacher | 411/433 |
| 7,093,400 B1 * | 8/2006 | Thompson et al. | 52/698 |
| 8,132,767 B2 | 3/2012 | Oh et al. | |
| 8,434,725 B2 | 5/2013 | Oh et al. | |
| 2006/0283137 A1 * | 12/2006 | Nold | 52/742.14 |
| 2010/0108840 A1 | 5/2010 | Oh et al. | |
| 2013/0243545 A1 | 9/2013 | Oh | |

FOREIGN PATENT DOCUMENTS

FR 2656140 A1 * 6/1991

* cited by examiner

*Primary Examiner* — Patrick Maestri

(57) ABSTRACT

An internally threaded anchor for use in poured concrete floors having a metal deck or a wood form. The threaded anchor provides quick and easy attachment to threaded support rods that carry racks for utilities, piping, or ceiling grid systems. Each threaded anchor is capable of accepting different diameter rods or bolts with different thread cuts. Each anchor accepts the different diameter threaded rods by a single insertion motion, without the need to thread the rod into the anchor. Full insertion is visually verifiable when the marked end of the rod inserted into the anchor is no longer visible. An authentication tag visible upon full insertion indicates that authorized rod is being used.

26 Claims, 12 Drawing Sheets

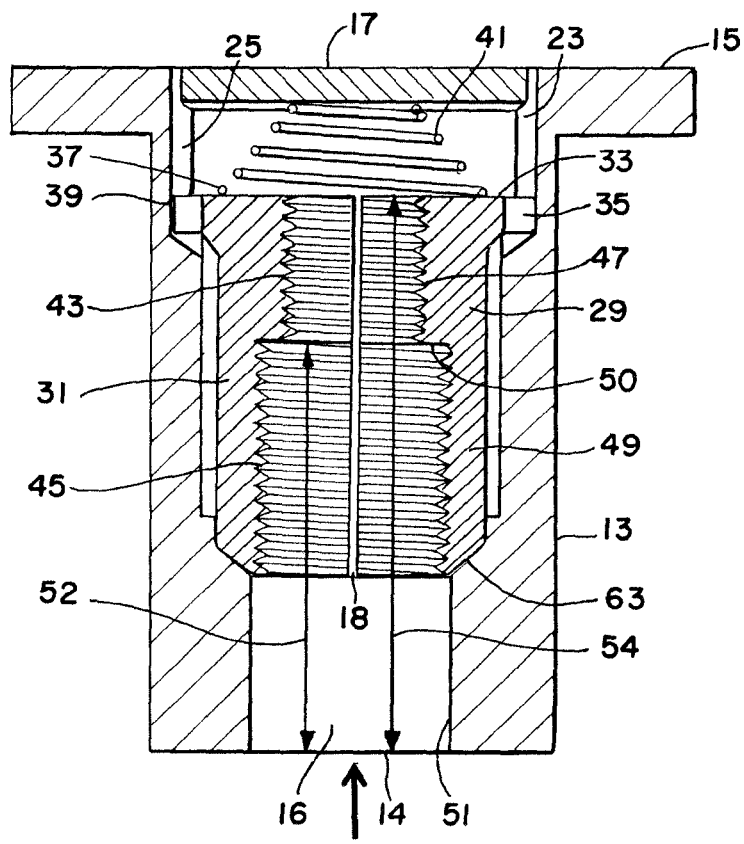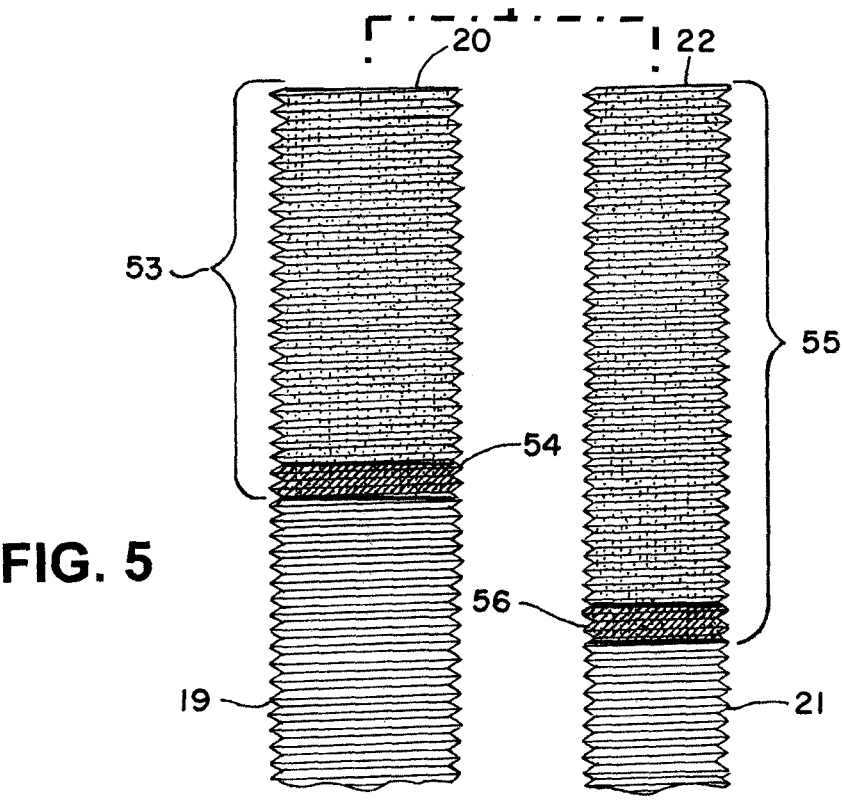
FIG. 5

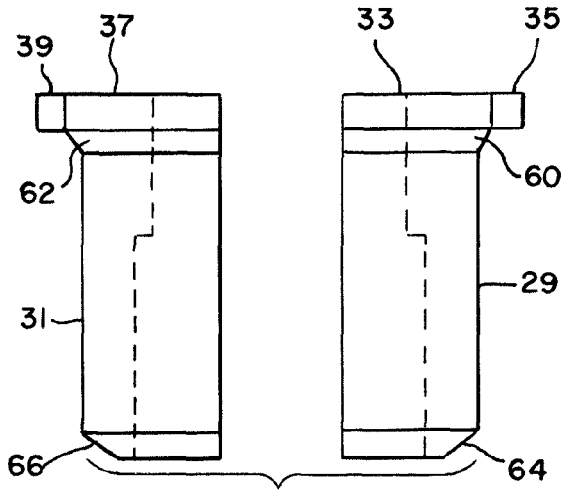
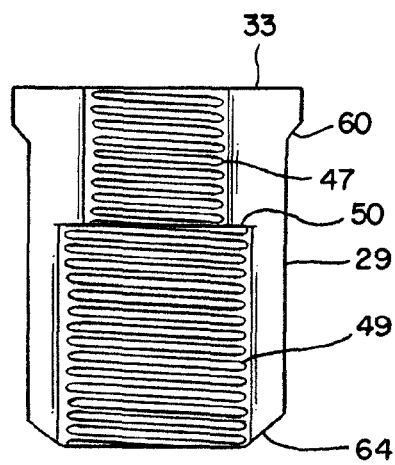
FIG. 8         FIG. 9
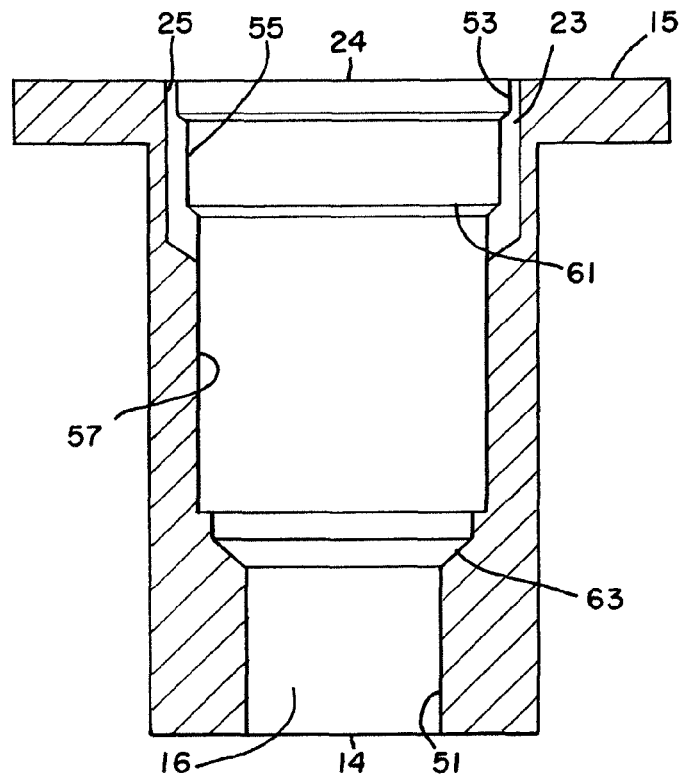
FIG. 10

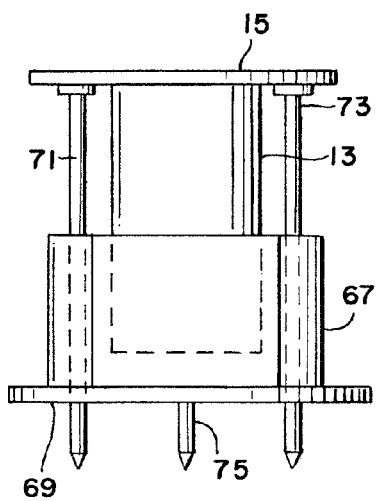
FIG. 14
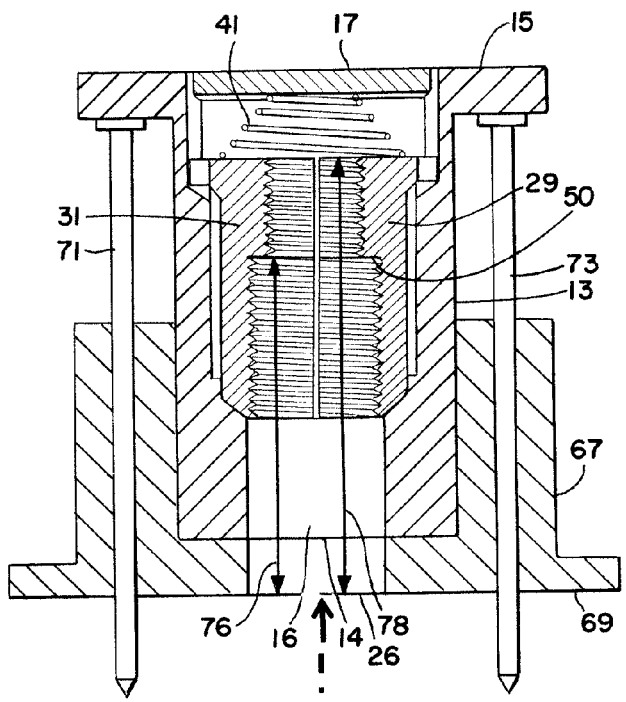
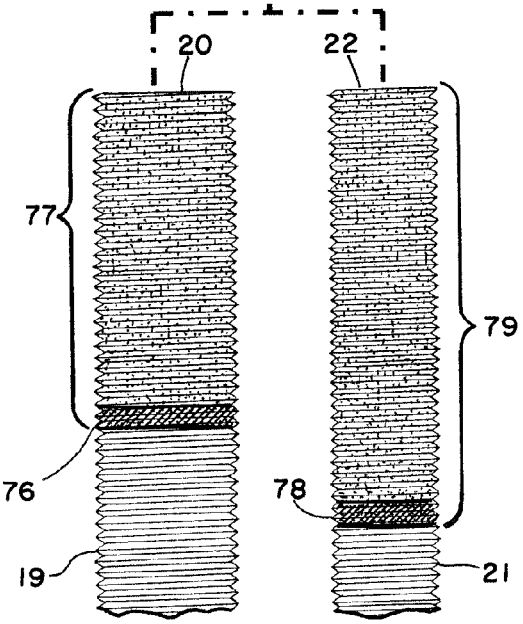
FIG. 15

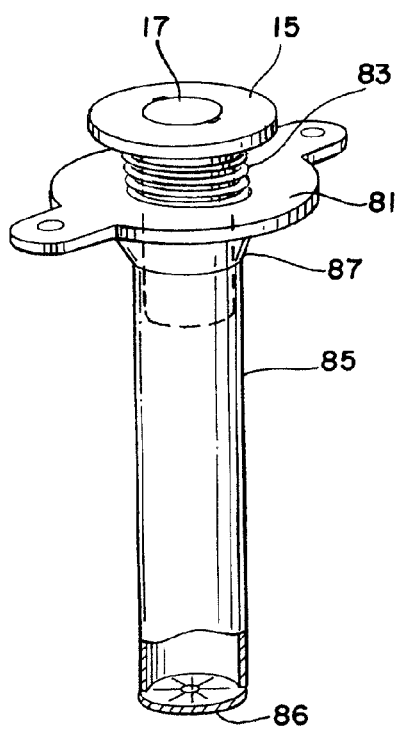
FIG. 16
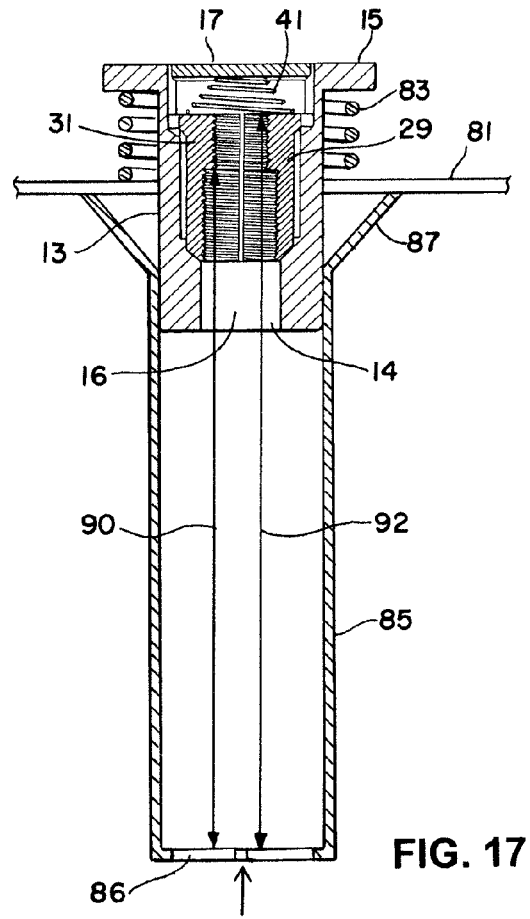
FIG. 17
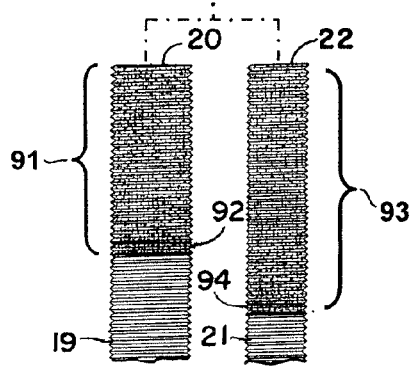

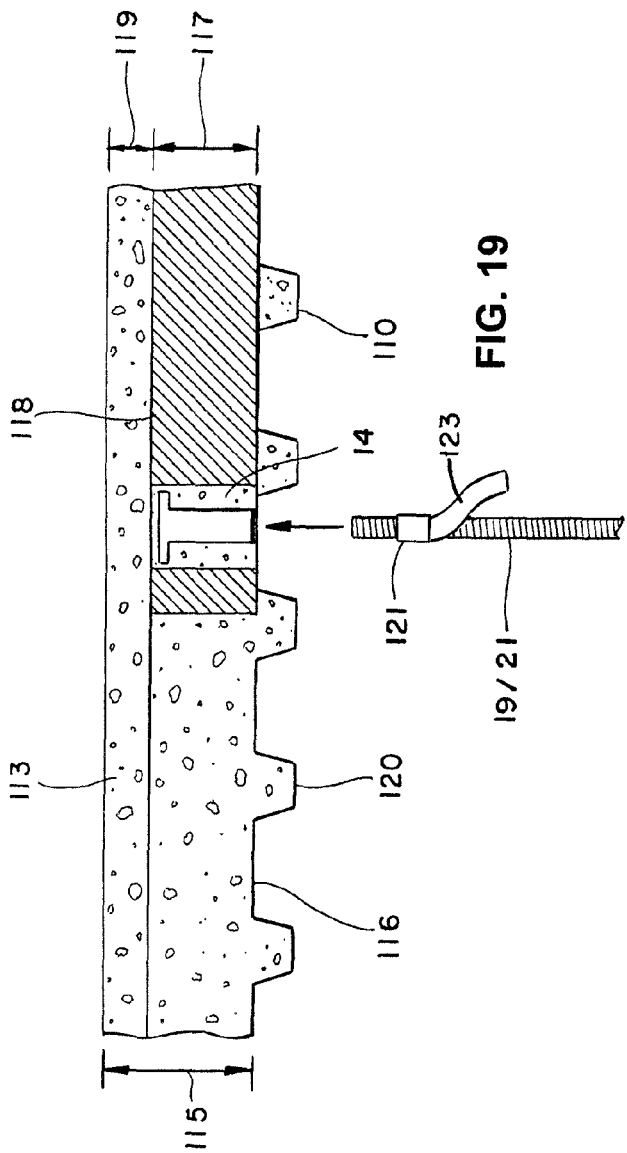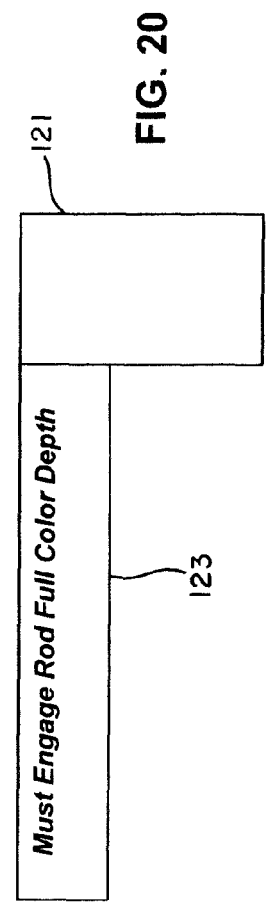

QUICK CONNECT ANCHOR FOR POURED CONCRETE CEILINGS ON METAL OR WOOD DECKS

CROSS REFERENCE TO RELATED APPLICATIONS

This application is a continuation-in-part of application Ser. No. 14/225,019 filed Mar. 25, 2014 for Quick Connect Threaded Anchor For Poured Concrete, Metal Deck And Wood Frame Floors.

BACKGROUND OF THE INVENTION

1. Field of the Invention

The present invention relates to improvements in anchors for poured concrete, metal deck or wood deck ceilings in multi-story buildings, and more particularly, pertains to new and improved threaded anchors that are attached to the metal or wood deck prior to pouring of the concrete so that when the concrete sets, these anchors may be used as support points for suspended utilities such as plumbing pipes, mechanical piping, mechanical equipment, cable trays, bus ducts, HVAC ducts, electrical conduit, conduit racks, junction boxes and panels, or for seismic bracing for example.

2. Description of Related Art

Various concrete inserts or anchors have been used to retain support rods in poured concrete ceilings. Examples of such devices are described in U.S. Pat. No. 6,240,697, granted Jun. 5, 2001 and U.S. Pat. No. 7,093,400, granted Aug. 22, 2006. The anchors described therein perform their functions satisfactorily. U.S. Pat. No. 6,240,697, for example describes an anchor that has the capability of accepting two different diameter threaded rod. However, the threaded rod has to be threaded into the anchor, located in the concrete ceiling, from the floor below. Because such anchors are utilized in high rise buildings in large quantity, threading a rod into each anchor is a very time consuming and inefficient procedure.

Quick acting nut or coupling assemblies which facilitate quick connection of a bolt by an initial axial insertion of the bolt into the specially designed nut and subsequent rotation of the bolt to tighten, are known in the art. An example of such a structure can be found in U.S. Pat. No. 5,427,488, granted Jun. 27, 1995 and U.S. Pat. No. 6,361,260, granted Mar. 26, 2002. The quick connecting nut or coupling assembly described in these patents require that a threaded bolt pass through the entire nut assembly starting at an input aperture and out an output aperture. U.S. Pat. No. 5,468,105 illustrates a quick connecting anchor for a wood deck poured concrete slab that uses sliding threaded segments like shown in U.S. Pat. Nos. 5,427,488 and 6,361,260. The anchor has a closed top. Threaded rod is connected by an axial insertion. The anchor is constructed so that the threads on the sliding segments engage the rod threads some distance away from the rod end.

The concrete inserts illustrated in U.S. Pat. No. 6,240,697 and U.S. Pat. No. 7,093,400, do not use a quick connect nut structure. They have one open end for threading a rod or bolt against a closed end. These concrete anchors do not provide a user with a visual indication of full engagement. Even when the threaded rod or bolt cannot be turned any further in the anchor, full engagement is not assured. Use of a quick connect coupling assembly such as described in U.S. Pat. No. 5,427,488, and U.S. Pat. No. 6,361,260, and the anchor described in U.S. Pat. No. 5,468,105, do not provide visual feedback of full engagement to a user inserting a rod into the anchor from the floor below. The user is left unsure of whether the threaded rod is fully engaged with the coupling segments of the anchor. Furthermore, these quick connect devices do not contemplate accepting more than one diameter of threaded rod.

The present invention provides a quick connecting threaded anchor for poured concrete, metal or wood decks, which allow for quick connection, by axial insertion of different diameter threaded rods in one anchor, while at the same time providing visual feedback that the threaded rod has been fully engaged by the anchor. Such a visual indication is critical for installation in high rise buildings that use the inserts as support for ducts, electrical conduits and the like, and require an anchor that will meet seismic requirements.

SUMMARY OF THE INVENTION

An anchor for poured concrete metal or wood decks has a plurality of threaded segments in a housing, each segment having a plurality of internally threaded diameters, allowing attachment of different diameter threaded rod to the same anchor. The multiple internal threaded diameter segments are downwardly biased inside the anchor casing. A threaded rod inserted into the anchor casing expands the segments during insertion. Upon full insertion, the segments move radially inward to engage the threads of the inserted rod. The threaded rod has an insertion end that is marked at a predetermined distance from the end or, for a predetermined distance along the length of the rod, providing a visual indicator. This marked distance relates to the physical dimension of the anchor being used and its placement in the concrete slab. The predetermined distance is equal to the distance the end of the threaded rod must travel for full insertion into the anchor. The threaded rod and anchor pair are matched so that full insertion of the threaded rod into the anchor causes the visual indicator on the rod to disappear. Absence of the visual indicator confirms full insertion and assures that maximum grasp is present between the anchor and threaded rod. This assurance is provided without requiring a user to physically turn the threaded rod. An authentication tag associated with the visual indicator remains visible upon full insertion of the rod to indicate that authorized correctly marked rod is being used.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 5 is a cross-sectional view of a quick connect anchor according to the present invention, showing its major parts and two different diameter rods paired with the anchor;

FIG. 8 is a plan view of internal arcuate segments of the quick connect anchor of the present invention;

FIG. 9 is a plan view of one of the internal threaded segments showing the threads;

FIG. 10 is a cross-section of the quick connect anchor, showing the internal cavity;

FIG. 14 is a perspective view of a quick connect anchor for attachment to a wood deck;

FIG. 15 is a cross-section of the quick connect anchor of FIG. 14 showing different diameter threaded rods paired with the anchor to provide a visual indication of full insertion;

FIG. 16 is a perspective of a quick connect anchor of the present invention for attachment to a metal deck;

FIG. 17 is a cross-section of the anchor of FIG. 16 showing different diameter threaded rod paired with the anchor to provide a visual indication of full insertion of the threaded rod;

FIG. 19 is a cross-section illustration of the quick connect anchor installed in a metal deck, after concrete has been poured over the metal deck and anchor;

FIG. 20 is a plan view of an alternate embodiment of a full insertion visual indicator which uses an additional authentication tag;

DETAILED DESCRIPTION OF THE PREFERRED EMBODIMENTS

Figure 1:
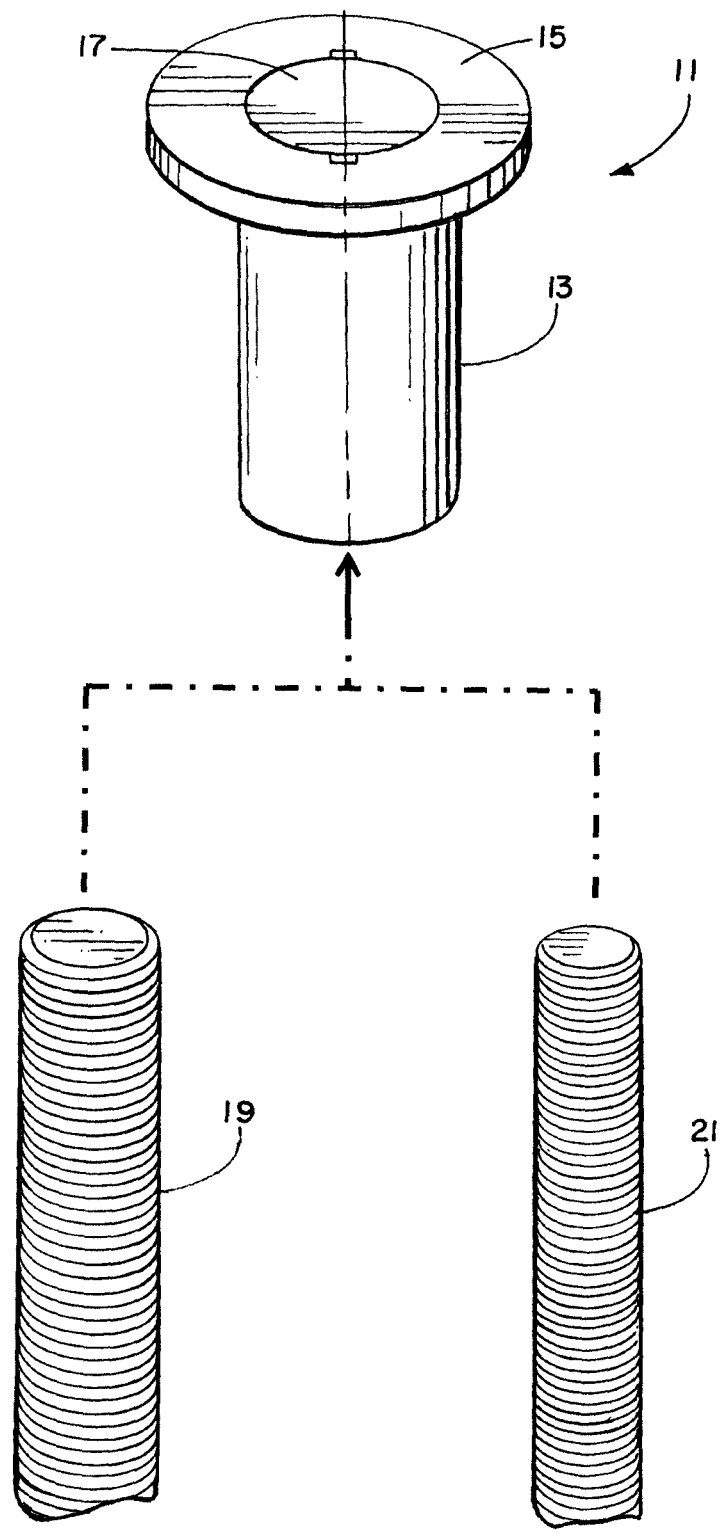
FIG. 1 is a perspective view of a quick connect anchor according to the present invention, illustrating different diameter rods paired with the anchor.

FIG. 1 illustrates a preferred embodiment of a quick connect threaded anchor 11 which has a cylindrical casing 13 made out of steel, such as stainless or galvanized steel, or a material having equivalent characteristics and strength. The cylindrical casing 13, and head section 15 are preferably formed from a single solid piece. An internal cavity of the casing 13 (FIG. 4) is capped at the head 15 by a circular plate 17. The plate 17 is preferably made of steel, such as stainless or galvanized steel, or a material having similar characteristics.

The quick connect anchor 11 is capable of receiving threaded rods 19 and 21 which have different diameters. Engagement is accomplished by a single axial thrust.

Figure 2:
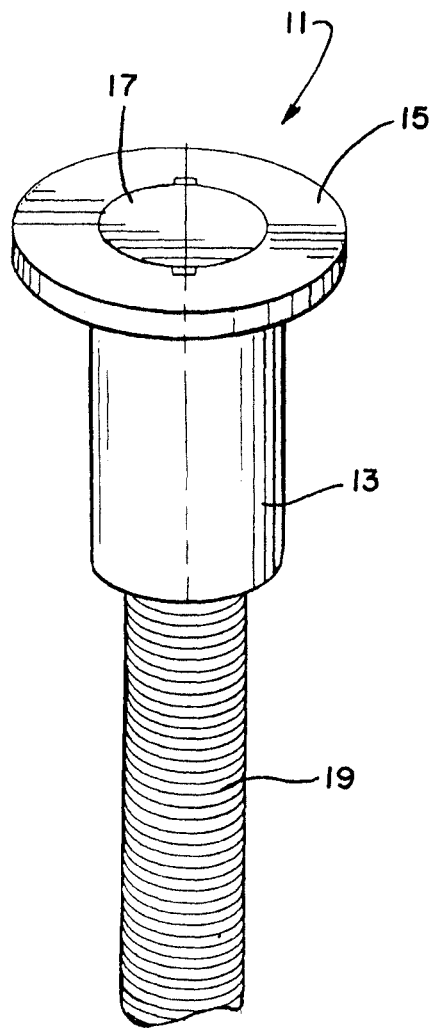
FIG. 2 is a perspective illustration of a quick connect anchor according to the present invention, with a certain diameter rod fully inserted.
Figure 3:
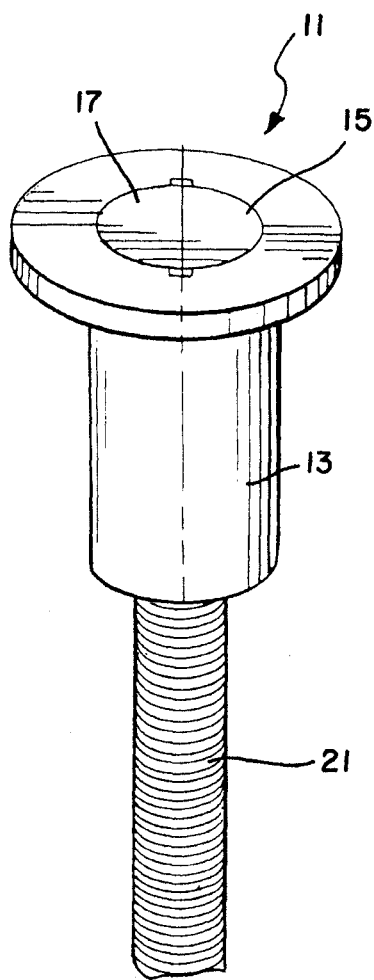
FIG. 3 is a perspective of a quick connect anchor according to the present invention, with a smaller diameter threaded rod fully inserted.

As shown in FIGS. 2 and 3, threaded rod 19 and threaded rod 21 are fully engaged by the same threaded anchor 11, even though the diameters of the rods are different. The diameter of threaded rod 19, for example, could be ½ inch. The smaller diameter threaded rod 21, for example, could be ⅜ inches or ¼ inch.

The quick connect anchor 11 allows both rods 19 and 21, which are paired with the anchor, to be rapidly engaged by the anchor, even though the diameters of the two threaded rods are different.

Figure 4:
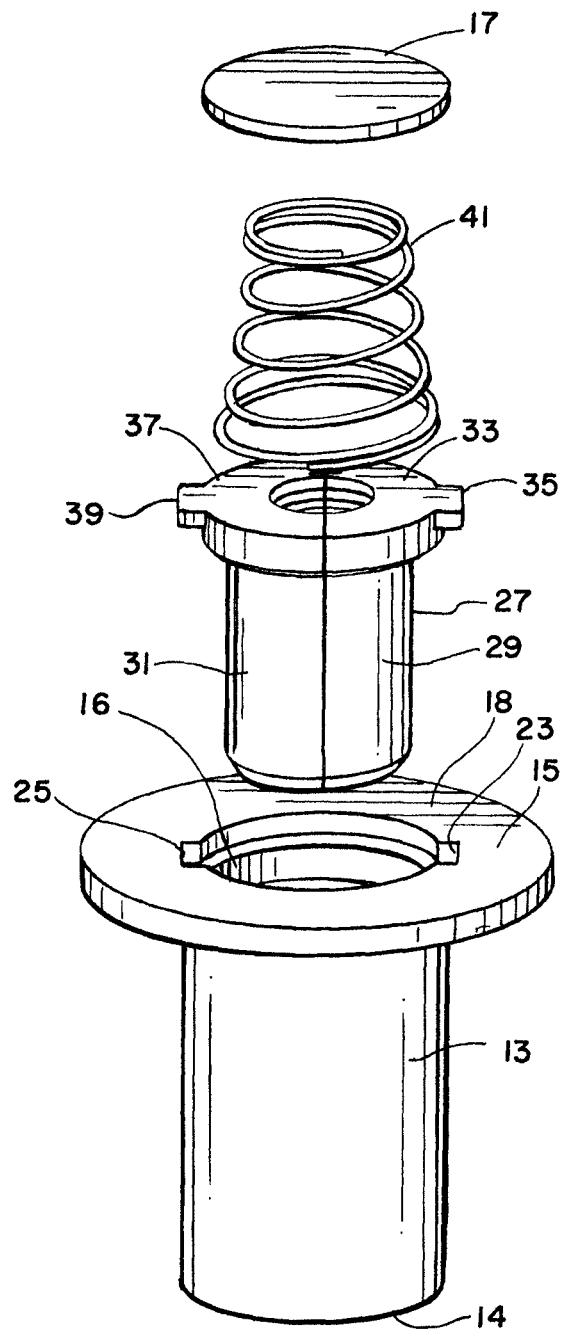
FIG. 4 is an exploded view of a quick connect anchor according to the present invention, showing its major internal components.

FIG. 4 illustrates the components inside a cavity 16 of cylindrical casing 13 that engage the threaded rod. A pair of arcuate internal threaded segments 27 are located in the cavity 16 of cylindrical casing 13. Arcuate segment 29 has an annular head 33. Arcuate segment 31 has an annular head 37. A tab 35 extends from head 33. A tab 39 extends from head 37. These tabs fit into slots 23, 25, respectively in the head 15 of the casing. The slots 23, 25 extend down the walls of the casing for a predetermined distance, as will be illustrated hereinafter.

The pair of arcuate internally threaded segments 27 are retained in the cavity 16 at the open end 14 of the casing 13 by a frustoconical surface as will be described hereinafter.

A spring 41, which is preferably spiral, having a wider diameter at one end than the other, although this is not required, pushes the segments 27 against the frustoconical surface. Any spring construction sufficient to provide the spring force required would be satisfactory. Spring 41 pushes the pair of arcuate internally threaded segments 31, 29 down towards the open end 14 of casing 13 against the frustoconical surface 63 (FIG. 5). The spring is retained in the casing 13 by a plate 17 that fits within an opening 18 in the head 15 of the casing 13. The plate 17, which is preferably round, fits into the circular opening 18 and is held in place permanently by tack welds, for example. Although other equivalent fastening mechanisms are contemplated.

FIG. 5 illustrates a combination of threaded rods and anchor, showing location of the internal threaded segments 29, 31 inside the cavity 16 of the cylindrical casing 13, ready to receive a threaded rod. The two arcuate internally threaded segments 29, 31 are held within the cavity 16 against the frustoconical surface 63 by spring 41 which is located between the plate 17 and the head portions 33, 37 at the first end of the arcuate internally threaded segments 29, 31. The spring 41 applies a downward force, causing the internally threaded arcuate segments 29, 31 to be contained in the relatively smaller diameter lower portion of cavity 16, leaving only a small gap 18 between the two segments.

The threaded rods 19, 21 that are paired with the anchor are capable of being inserted into the anchor by an axial insertion through the open end 14 of the casing 13. Such an insertion will cause the threaded rod to engage the threads of the segments. The threaded rod 19, which has a larger diameter, will engage the lower threads 45, 49 of the arcuate segments 31, 29. The threaded rod 21, which has a smaller diameter, will engage the upper threads 43, 47 of the segments. In either case, the rod pushes both segments 31, 29 upward against the force of the spring 41 into the relatively larger diameter portion of the cavity 16, allowing the segments 29, 31 to separate, increasing the gap 18 between the segments and allowing the rod to slide between the segments.

In the example of FIG. 5, each segment 29, 31 has two different internally threaded diameters. Segment 31 has a lower thread portion 45 that is greater in diameter than the upper thread portion 43. Segment 29 has a lower thread portion 49 that matches thread portion 45 on segment 31. Segment 29 has an upper thread portion 47 that matches upper thread portion 43 on segment 31. The two segments essentially form internal threads for accepting two different diameter rods 19 and 21, for example. Rod 19 would be engaged by the larger diameter internal thread portion 45, 49 of segments 31, 29. Full insertion of rod 19 is required in order to obtain full thread engagement between the rod 19 and internal threads 45 and 49 of the segments. Full insertion occurs when the end 20 of the rod 19 contacts the ridge 50, a transition between the larger diameter threaded portions 45, 49 and the smaller diameter threaded portions 43, 47 of the internally threaded segments 31, 29.

To ensure that the end 20 of rod 19 is in contact with transition ridge 50 upon axial insertion of the rod 19, a certain length 53 on rod 19 from its end 20 is marked with a brightly colored paint or plastic, or equivalent visual indicator. For example, instead of marking a length 53 of rod 19, a colored band 54 placed at a distance 53 from the end 20 of rod 19 would work as well. The distance 53 from the end 20 of rod 19 is equal to the distance 52 from the transition ridge 50 to the open end 14 of casing 13.

Thus, if upon axial insertion of rod 19, the marking on rod 19 disappears into the casing 13, as viewed from the open end 14, one can be assured that the end 20 of rod 19 is engaging the transition ridge 50 and the thread portions 45, 49 of the segments 31, 29 are fully engaging the threaded rod 19. There is no requirement for the installer to rotate the rod to obtain maximum engagement.

If rod 21 is being inserted into the anchor, rod 21 engages the smaller diameter upper internal threads 43, 47 of the arcuate segments 31, 29. In order to ensure that the end 22 of smaller diameter rod 21 fully engages all the thread portions 43, 47 of segments 31, 29 upon an axial insertion into the open end 14 of casing 13, the rod 21 is marked for a length 55 from the end 22 with a brightly colored paint, or a colorful coating. Alternatively, the rod 21 may be marked by a colorful band 56 at a distance 55 from the end 22 of rod 21. This distance 55 is equal to the distance 54 from the annular head of the segment pair at the first end of segments 31, 29 to the opening 14 at the casing.

Full insertion in an axial direction of the threaded rod 21 is visually indicated when the marking on the rod at the distance 55 disappears from view into opening 14, when viewed from below. No rotation of the rod 21 is required by the installer to obtain full insertion.

Figure 7:
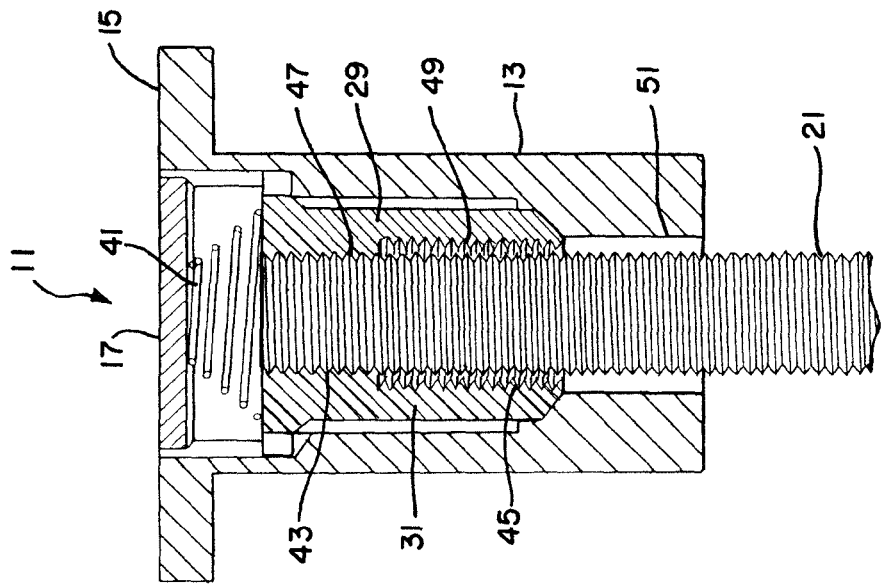
FIG. 7 is a cross-sectional view of a quick connect anchor according to the present invention, showing full engagement with a smaller diameter threaded rod.
Figure 6:
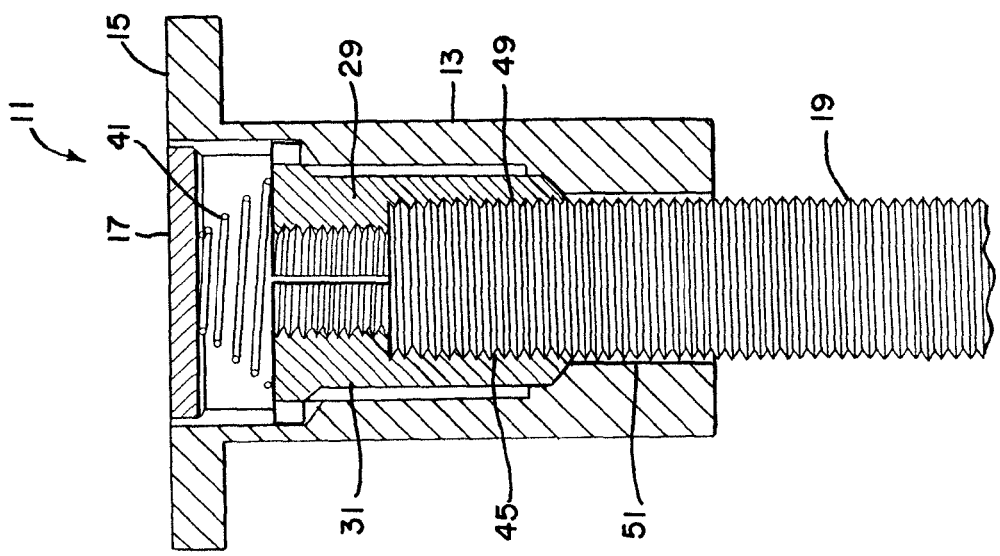
FIG. 6 is a cross-sectional view of a quick connect anchor according to the present invention, showing full engagement with a certain diameter rod.

FIG. 6 illustrates full engagement of the larger diameter threaded rod 19 by the anchor 11. FIG. 7 illustrates full engagement of the smaller diameter rod 21 by the same anchor 11.

FIGS. 8, 9 and 10 show a more detailed view of the interaction between the arcuate internally threaded segments 31, 29 with the cavity 16 in cylindrical casing 13. FIG. 8 illustrates the two arcuate internally threaded segments 29, 31 that act in concert inside the cavity 16 of the cylindrical casing 13 to first allow entry of a rod and then fully engage the threads of the rod. Each arcuate segment 29, 31 has an annular head 33, 37 at the top or first end. Each annular head 33, 37 has a tab 35, 39, extending therefrom. A frustoconical surface 60, 62, is located under each annular head. A frustoconical surface 64, 66 is at the second end of each segment 29, 31.

FIG. 9 illustrates the internal thread portions 49, 47 of one arcuate segment 29. It should be understood that segment 31 is a mirror image of segment 29. A transition ridge 50 separates the smaller diameter thread portion 47 from the larger diameter thread portion 49. Although the portions 49, 47 are called thread portions, as can be seen, they are not a thread in the traditional sense. Rather, the thread portions are actually slanted individual slots in the internal walls of the segment.

The segments 31, 29 fit into the cavity 16 of cylindrical casing 13. The cavity 16 has an opening 14 at the second end of the cylindrical casing 13 and an opening 24 at the first end of the cylindrical casing 13. Opening 14, at the second end, has a diameter 51 that is smaller than the diameter of the opening 24 at the first end. The diameter 51 of opening 14 is large enough to allow passage of the largest threaded rod acceptable by the anchor. The main portion 57 of the cavity 16 has a diameter which is greater than the diameter of the opening 14 at the second end. A frustoconical surface 63 transitions the larger diameter of section 57 of the cavity to the smaller diameter of section 51 of the cavity. A top portion of the cavity has a diameter 55 that is larger than the diameter of the main portion 57. A frustoconical surface 61 transitions the diameter of this larger diameter 55 to the slightly smaller diameter 57 of cavity 16.

The segments 31, 29 fit into cavity 16 so that tabs 39, 35 slide into the slots 25, 23, respectively, in the internal walls of the cylindrical casing 13. The tabs 35, 39 prevent rotation of the arcuate internally threaded segments 29, 31, allowing the segments to only move axially in the cavity 16 of the casing 13.

The frustoconical surfaces 64, 66 of segments 29, 31 respectively, engage the frustoconical surface 63 that transitions the first diameter 51 to the second diameter 57 of the cavity. The frustoconical surfaces 60, 62 of the arcuate internal threaded segments 29, 31, respectively, engage the frustoconical surface 61 that transitions the second diameter 57 with the third diameter 55 of the cavity 16. The spring, as shown in FIG. 5, forces the segments 29, 31 against the first frustoconical surface 63 and second frustoconical surface 61 of the cavity 16. Any axial insertion of a threaded rod through opening 14 into cavity 16 will cause axial movement of both segments in an upward direction against the spring, allowing the segments to separate, accept the rod to full insertion, and engage the threaded rod. Once axial movement of the threaded rod stops, the spring 41 forces the arcuate internally threaded segments 29, 31 down. This forces the segments 29, 31, guided by the frustoconical surfaces 61, 63 of the casing 13, to move radially inward and against the threads of the threaded rod, causing the segments to tightly engage the threaded rod.

Figure 11:
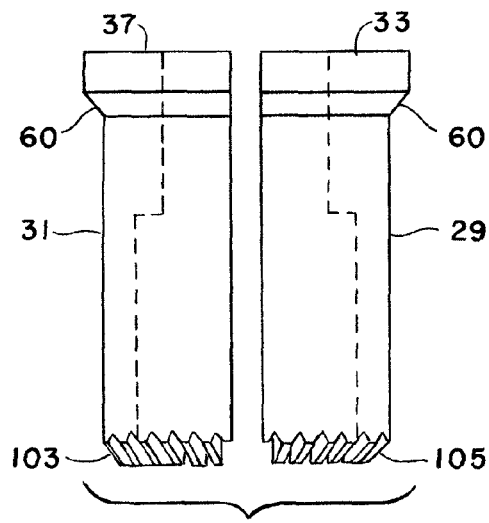
FIG. 11 is a plan view of an alternate embodiment of internal arcuate segments of the quick connect anchor of the present invention.
Figure 12:
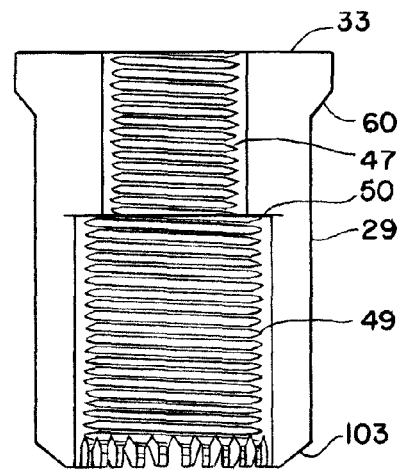
FIG. 12 is a plan view of one of the internal threaded segments showing the threads and teeth.
Figure 13:
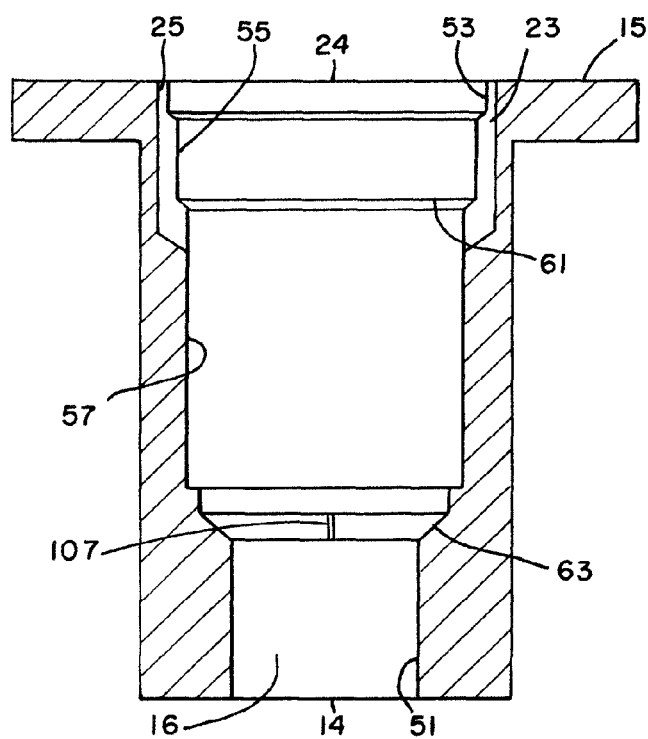
FIG. 13 is a cross-section of an alternate embodiment of the quick connect anchor showing the internal cavity and teeth tab.

FIGS. 11, 12 and 13 show an alternate embodiment of the internally threaded segments 31, 29 and their interaction with an alternate cavity 16 in casing 13.

The frustoconical surfaces at the second end of each segment 29, 31 has a row of teeth 103, 105 formed into the surface at the second end. At least one thread engagement tab 107 located on the frustoconical surface 63 in the cavity engages the teeth 103, 105 on the segments 28, 31 during full engagement between the threaded segments and a rod. This prevents rotation of the segments in the cavity 16 of the casing, thus allowing the segment to only move axially in cavity 16 of casing 13. Preventing rotational movement of the segments 29, 31 after full engagement with the rod allows for disengagement of the threaded rod from the anchor, if required because of faulty installation, for example.

FIGS. 14 and 15 show an anchor insert kit utilizing the quick connect anchor discussed above, for attachment to a wood deck. The casing 13 with its head 15 is encased by a sleeve 69 having a boss 67 at the second end of the casing 13. The boss holds a plurality of nails 71, 73, 75 with heads that are located underneath the head 15 of the casing 13. The sleeve 69 is nailed to the wooden deck.

After concrete is poured, embedding the entire structure of FIG. 14, the deck, to which the anchor is attached, is removed from below, revealing the open end 14 of cavity 16 in the casing 13. The rest of the anchor structure remains entirely encased in the concrete. The open end is directed down and only accessible from the floor below.

Many anchors must be embedded in a concrete ceiling for suspending required structures. A threaded rod 19 or 21 must be inserted into each anchor through the opening 14, at the second end of the anchor. The quick connect capability of the anchor, according to the present invention, allows a single axial thrust of the rod 19 or the smaller diameter rod 21 to cause full engagement. Marking on the rod provides a visual indication that full engagement has occurred.

Use of specially marked rods 19, 21 that are paired with an anchor are a critical part of the kit. The rods 19, 21 specifically adapted to be used with the anchor insert of FIG. 14 ensure that an initial axial insertion of the rod 19, 21 into the aperture 16 of the anchor through opening 14 is in full engagement. Threaded rod 19 is marked a certain distance 77 from its end 20 by a brightly colored paint or other coating, or by a band 76 located a distance 77 from the end 20. For rod 19, the distance 77 is equal to the distance 76 from the transition ledge 50 of the larger diameter thread portion to the opening 26 in the sleeve 69.

Full insertion of rod 19 into the anchor is visually indicated when the marked segment 77 of rod 19, or the marked band 76 of rod 19 disappears from view to the person inserting the rod.

The smaller diameter rod 21, is also paired with the anchor. Rod 21 is colorfully marked a fixed distance 79, equal to the distance 78 between the head 15 of the segments 29, 31 to the opening 26 in sleeve 69.

FIGS. 16 and 17 illustrate an anchor kit for a poured concrete metal deck utilizing the quick connect threaded anchor described above. The cylindrical casing 13 of the anchor is attached to a plastic sleeve 85 having expanding fingers 87 at the top end and an opening 86 at the bottom end. A plate 81 is attached to the outside of the cylindrical casing and may be held in place by a spring 83 and the expanding fingers 87. Alternatively, the plate 81 may be fixedly attached to the casing 13.

The anchor is inserted through an aperture in a metal deck (not shown) and is held to the metal deck by the plate 81 and fingers 87 of the sleeve. The plastic sleeve 85 passes through the aperture in the metal deck and extends below the metal deck. The plate 81 prevents the casing 13 from passing through the aperture. After concrete is poured on the metal deck, the entire structure of the anchor, above plate 81 is encased in concrete and firmly held to the metal deck. The sleeve 85 that extends through the deck protects the opening 14 in cavity 16 of the cylindrical casing 13 of the anchor from being plugged by fire retardant material that is typically sprayed on the underside of the deck.

Many anchors are used in such concrete ceilings. Each of these anchors must receive a threaded rod 19, 21. According to the present invention, a single initial axial thrust of the threaded rod 19 or 21 through the opening 86 in the sleeve 85 and into the cavity 16 through opening 14 of cylindrical casing 13 will fully engage the rod.

Full engagement is visually indicated to the person inserting the rods 19, 21. The rods being used are adapted to this particular anchor by having a portion of the end extending from the inserting end 20 or 22, marked by brightly colored paint or covered in a brightly colored wrap. Full insertion and engagement is indicated when the brightly colored portion of the rod disappears into sleeve 85.

If rod 19 is being inserted into the anchor of FIG. 17, a full insertion would be indicated by the colored length 91 of rod 19 disappearing, or alternatively, the color band 92 on the rod 19 disappearing. This will occur because the distance 91 from end 20 of rod 19 is equal to the distance 90 of the anchor. Alternatively, the band 92 on rod 19 is placed at distance from the end 20 that is equal to the distance 92 in the anchor.

If rod 21 is used, full insertion of rod 21 will be indicated if the color portion 93 of rod 21 from end 22 completely disappears upon insertion. Or alternatively, the band 94, which is located at a distance 93 from the end 22 disappears upon insertion. This will occur only if the length 93 from the end 22 of rod 21 is equal to the distance 92 in the anchor.

As can be seen from the above description, the quick connect threaded anchor kit of the present invention provides a quick connection of a threaded rod to an anchor and provides a visual indication that a complete connection and engagement has occurred. No twisting of the rod is required to ensure complete connection.

Use of these quick connect anchors in high rise buildings as anchors for suspending utilities from a concrete ceiling can only be permitted if they equal or surpass seismic stress requirements set by applicable building codes.

Figure 18:
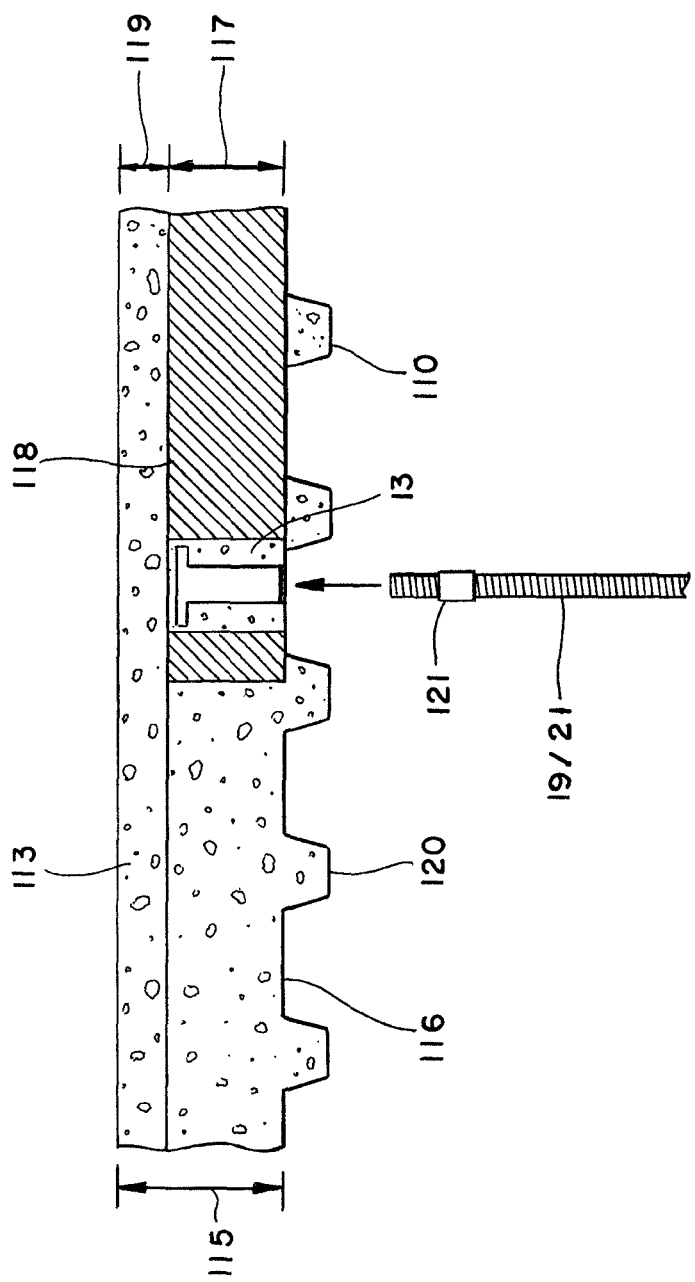
FIG. 18 is a cross-section illustration of the quick connect anchor installed in a metal deck, after concrete has been poured over the metal deck and anchor.

Take for example the installation of the threaded anchor of the present invention in a concrete metal deck, as illustrated in FIG. 18. The corrugated metal deck 110 typically receives a level of concrete at a height 115 of 3¼ inches measured from the upper ridges 116 of the corrugated plate 110. Building codes mandate that a minimum top layer 119 of 1 inch of concrete 113 not contain any inserts. Having the top layer 119 at least 1 inch thick leaves a maximum installation zone 117 of 2¼ inches for the anchor 13. This requires that the anchor 13 be about 2 inches long. The anchor 13 cannot be mounted on the lower ridge 120 of the metal deck 110. It must be mounted on the upper ridge 116 of the corrugated deck 110 because of the requirement that the anchor 13 be completely and fully surrounded by concrete. Mounting it in the valley on the lower ridge 120 of the deck 110 is not permitted because the anchor 13 will not be completely and fully surrounded by concrete after the pour, due to cavitation and limited space.

As a result, the preferred length of the anchor 11 (FIG. 1) is 1¾ inches and no greater than 2 inches. This length restriction for the anchor 11 requires a length restriction on the thread length of internally threaded segments 31, 29. Total thread length can be no greater than 1 inch long. This 1 inch thread length must be divided into two different diameter thread lengths. The larger bottom diameter thread length is preferably 0.61 inches long. The smaller top diameter thread length is preferably 0.39 inches long.

Thus, the threaded region 47 (FIG. 9) for the smaller ⅜ inch rod in the segments 29, 31 would be about 0.39 inches in length. The threaded region 49 (FIG. 9) for the larger ½ inch diameter rod on the segments 29, 31 would be about 0.61 inches in length. The problem with such a short thread length is meeting the load bearing requirement imposed on anchors by the applicable seismic standards. To meet this load bearing requirement, the rods 19, 21 of FIG. 18 must be fully engaged with all the threads along the length of the arcuate segments 29, 31. For the anchor 13 illustrated in FIG. 18 the rod 19/21 is marked at a distance 121 from the end of the rod to ensure full insertion when the marked portion disappears into the anchor 13 or plastic sleeve 85. FIG. 18 does not show a plastic sleeve. The marked portion 121 of the threaded rod 19/21 is marked accordingly, so that the marked portion will disappear into the anchor body of anchor 13 upon full insertion.

FIG. 19 illustrates the installation of FIG. 18 with the added feature of a full insertion visual indicator portion that has an authentication tag. An example of a combination visual indicator and authentication tag is shown in FIG. 20. The visual indicator portion 121 is brightly colored and wrapped around the insertion end of a threaded rod, as shown in FIG. 19. The authentication tag 123 is attached to the indicator portion 121 and hangs down from the indicator portion 121 when it is on an end of the threaded rod, as shown in FIG. 19.

The authentication tag 123 is used to provide a visual indicator to an inspector viewing the inserted rod from below that authorized properly marked rod is being used. For example, if threaded rod that is not marked with a full insertion visual indicator is used, there will be no display of a visual indicator, even if full insertion of the rod did not occur. This inadequate insertion would visually appear to be a full insertion from below.

To prevent the use of unauthorized threaded rod, an authentication tag 123 is attached to the rod so that it hangs down below the visual indicator portion when the rod is fully inserted. The authentication tag is a different color, like white for example, then the full insertion indicator which may be red, for example. The authentication tag is viewable from below even when the full insertion indicator has disappeared into the anchor. The presence of the authentication tag assures an inspector that an authorized appropriately marked rod is being used and that it is fully inserted.

The load bearing requirement of each anchor is high. Preferably, each anchor should have a load bearing capacity that is higher than the rated bearing capacity of the threaded steel rods utilized. An A36 threaded rod is used for both the ½ inch diameter and the ⅜ inch diameter rods illustrated. The ½ inch A3 steel threaded rod is rated at 8,236 pounds. The ⅜ inch A36 steel threaded rod is rated at 4,445 pounds.

To ensure that the anchors of the present invention will support the loads required in the field, the inventors tested the holding capacity of an anchor using a ½ inch diameter A36 steel threaded rod and a ⅜ inch diameter A36 steel threaded rod. The anchor used in the test had internal threaded segments 31, 29 which were designed to accommodate both a ⅜ inch diameter threaded rod and a ½ inch diameter threaded rod.

A tension test to determine the failure load of a threaded rod and anchor assembly for both the ½ inch diameter rod and the ⅜ inch diameter rod was set up utilizing a universal hydraulic test machine with a calibrated load cell. The test set up anchored the quick connect anchor of the present invention to a solid test bed. The threaded rod was fully inserted into the anchor by a vertical thrust, noting that the marked end was no longer visible. The other end of the threaded rod was inserted into a load cell assembly of the hydraulic test machine. The hydraulic test machine then pulled on the unconnected end of the threaded rod until failure. Three tests were conducted on the ½ inch rod with failure resulting at the loads, in pounds, noted in Table 1 below.

TABLE 1

| Test # | Load (lbs.) | Rod Size (inch) |
|---|---|---|
| 1 | 10,100 | ½ |
| 2 | 9,800 | ½ |
| 3 | 9,999 | ½ |

All three tests of the ½ inch rod indicated failure at about 10,000 pounds, as shown in the table. These failures exceed the capacity of the ½ inch diameter rod by at least 1,500 pounds. The ½ inch A36 steel threaded rod is rated at 8,236 pounds.

Three tests were conducted for the ⅜ inch diameter threaded rod under the same protocol as the ½ inch diameter threaded rod. The results are set forth in Table 2 below.

TABLE 2

| Test # | Load (lbs.) | Rod Size (inch) |
|---|---|---|
| 1 | 6,300 | ⅜ |
| 2 | 6,780 | ⅜ |
| 3 | 6,971 | ⅜ |

A ⅜ inch diameter A36 steel threaded rod is rated at 4,445 pounds. Failure occurred at over 6,000 pounds for the ⅜ inch threaded rod, as shown in the table.

As these tests indicate, the holding capacity of the anchor far exceeds the rated capacities of the ⅜ inch and ½ inch A36 steel threaded rod. Furthermore, the failures that occurred at the high loads shown in Tables 1 and 2 were failures of the threaded rod itself. The anchor and its internally threaded segments did not fail.

The results of these tests showed that the quick connect anchor of the present invention exceeded the rated capacity of the threaded rod, used with the anchor. These ratings meet, if not exceed the applicable building code requirements.

Figure 21:
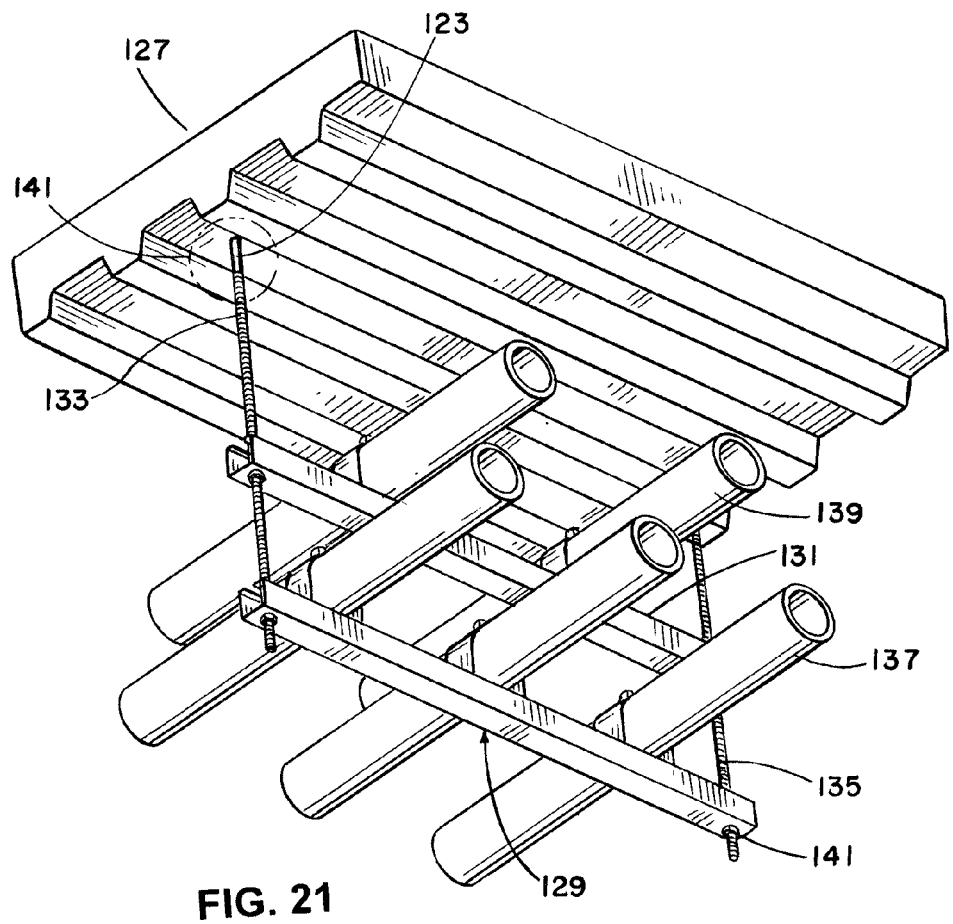
FIG. 21 is a perspective illustration of a quick connect anchor system of the present invention suspending a trapeze support structure from a poured concrete ceiling.

The tension capacities of the anchors take on a critical importance when they are used to suspend utilities from concrete ceilings, as illustrated in FIG. 21. A poured concrete ceiling 127 over a corrugated metal deck has embedded therein a plurality of anchors 14, as shown in the expanded view 141 of FIG. 22. A pair of threaded rods 133, 135 for example, are utilized to support a trapeze structure made up of multiple transverse metal brackets 129, 131 fastened to the threaded rods 133, 135. The rods each have a marked predetermined distance 121 from the insertion end (FIG. 19) and an authenticated tag 123 extending down beyond the marked distance 121. The brackets are fixed to the threaded rods by nuts 141, for example, spaced at convenient distances to accommodate conduit or piping 137, 139 for example, fastened to the transverse support brackets, which act as support platforms.

The quick connect feature of the anchor 14 becomes critical in the installation of a trapeze structure, such as shown in FIG. 21.

Figure 22:
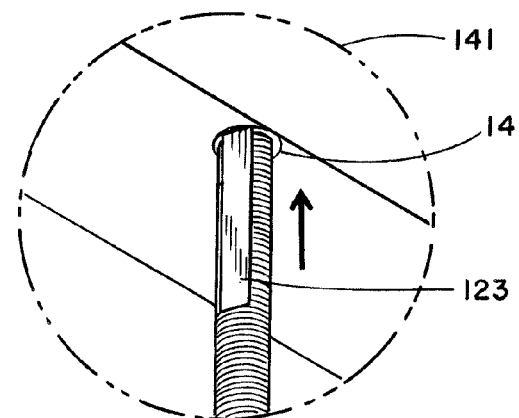
FIG. 22 is a perspective of the area in FIG. 21, blown up, to show a threaded rod engaging with a quick connect anchor using the visual indicator of FIG. 20.

These trapeze structures are assembled offsite and brought onto the building site with the rods and transverse support brackets attached, ready for installation. The alignment of the rods 133, 135 with their respective quick connect anchors in the concrete ceiling, and connection by an upward thrust into the anchors quickly mounts the entire structure. However, it is critical to provide assurance that full engagement has been made. This can only be provided by the present invention. By having the end of the threaded rod marked at a predetermined distance, so that it disappears only upon full insertion into the quick connect anchor, such assurance is provided. Furthermore, correct installation of the pre-assembled trapeze structures can be ascertained from the floor below, looking up at ceiling 127. Simply looking up to see if any brightly colored portions of the rods are exposed to view, is all that is required. If no brightly colored portion is exposed, the rods are fully engaged. The authentication tag 123 will hang down as shown in FIGS. 21 and 22 to provide an indicator that appropriately marked rods have been installed.

The present invention provides a quick connect anchor that has tensile holding strength exceeding the failure load of the rods used. The anchor, when utilized with an appropriately paired threaded rod assures full insertion and holding of the rod by the anchor beyond the capacity of the rod itself. A visual indication of full insertion is provided, to not only the installer, and also to a subsequent inspector. The inspector gets the added indication that appropriately marked rods have been used, by the presence of the authentication tag. The quick connect anchor and the specifically adapted threaded rods allows pre-assembly of trapeze systems for quick installation in the field, all with visual assurance that full connection has been made, providing optimum holding load, simply by pushing the rods into the respective anchors.

What is claimed is:

1. A quick-connect anchor for accepting threaded rod of different diameters once encapsulated by concrete poured over a metal deck, at about a thickness of 3 to 3¼ inches, the anchor comprising:
   a casing no longer than 2¼ inches attachable to the metal deck, the casing allowing at least a 1 inch concrete layer on top of the encapsulated anchor, the casing having a first end and a second end, a head closing the first end and an opening of a predetermined diameter at the second end, a cavity in the casing extending from the first end to the second end, the casing having a diameter larger than the diameter of the opening at the second end of the casing;
   a plurality of separate arcuate internally threaded segments captured in the cavity of the casing, each segment adapted for independent axial movement in the casing, each segment having a first end and a second end, the second end of each segment located closest to the open second end of the casing, each segment having at least two different diameter thread portions along its length, a larger diameter thread portion at the second end of each segment, and a smaller diameter thread portion at the first end of each segment;
   a spring in the cavity of the casing between the head at the closed first end of the casing and the first end of the plurality of arcuate internally threaded segments; and
   a plate located on the cylindrical casing for holding the casing to the metal deck before concrete is poured, with the open second end of the casing adjacent to an aperture in the metal deck.

2. The quick-connect anchor of claim 1 wherein the head closing the first end of the casing comprises an opening having a diameter larger than the diameter of all the internally threaded segments in the cavity; and
   a plate sized to fit within the opening, permanently attached thereto after the internally threaded segments are placed inside the cavity.

3. The quick-connect anchor of claim 1 wherein each arcuate internally threaded segment has an annular head portion at the first end, a frustoconical surface underneath the head portion, and a frustoconical surface at the second end.

4. The quick-connect anchor of claim 3 wherein each arcuate internally threaded segment has a tab extending from the annular head portion.

5. The quick-connect anchor of claim 3 wherein each arcuate internally threaded segment has teeth in the frustoconical surface at the second end.

6. The quick-connect anchor of claim 4 or 5 wherein the cavity in the casing has a first diameter at the first end of the casing, a second diameter at the second end of the casing different from the first diameter, and a third diameter between the first and second diameter of the casing, different from the first and second diameter.

7. The quick-connect anchor of claim 6 wherein a first frustoconical surface transitions the first diameter to the third diameter of the cavity, and a second frustoconical surface transitions the third diameter to the second diameter of the cavity in the casing.

8. The quick-connect anchor of claim 7 wherein each arcuate internally threaded segment has an annular head portion at the first end, with the frustoconical surface underneath the head portion engaging the first frustoconical surface in the cavity, and the frustoconical surface at the second end of the internally threaded segment engaging the second frustoconical surface in the cavity.

9. The quick-connect anchor of claim 7 further comprising slots in the cavity wall of the casing between the first end and the first frustoconical surface to receive respective tabs from the internally threaded segments.

10. The quick-connect anchor of claim 7 further comprising at least one tab on the second frustoconical surface of the cavity to engage the teeth in the internally threaded segment.

11. A quick-connect anchor for accepting threaded rod of different diameters, once encapsulated by concrete poured over a wood deck at about a thickness of 3 to 3¼ inches, the anchor comprising:
   a casing no longer than 2¼ inches attachable to the wood deck, the casing allowing at least about a 1 inch concrete layer on top of the encapsulated anchor, the casing having a first end and a second end, a head closing the first end and an opening of a predetermined diameter at the second end, a cavity in the casing extending from the first end to the second end, the casing having a diameter larger than the diameter of opening at the second end of the casing;
   a plurality of separate arcuate internally threaded segments captured in the cavity of the casing, each segment capable of independent axial movement in the casing, each segment having a first end and a second end, the second end of each segment located closest to the open second end of the casing, each segment having at least two different diameter thread portions along its length, a larger diameter thread portion at the second end of each segment and a smaller diameter thread portion at the first end of each segment;
   a spring in the cavity of the casing between the head at the closed first end of the casing and the first end of the plurality of arcuate internally threaded segments;
   a sleeve with a boss attached to the exterior of the casing at the open second end; and
   a plurality of nails held by the boss with the heads of the nails located underneath the head at the closed first end, the nails adapted for holding the casing to the wood deck before concrete is poured.

12. The quick-connect anchor of claim 11 wherein the head closing the first end of the casing comprises an opening having a diameter larger than the diameter of all the internally threaded segments in the cavity; and
   a plate sized to fit within the opening, permanently attached thereto after the internally threaded segments are placed inside the cavity.

13. The quick-connect anchor of claim 11 wherein each arcuate internally threaded segment has an annular head portion at the first end, a frustoconical surface underneath the head portion, and a frustoconical surface at the second end.

14. The quick-connect anchor of claim 13 wherein each arcuate internally threaded segment has a tab extending from the annular head portion.

15. The quick-connect anchor of claim 13 wherein each arcuate internally threaded segment has teeth in the frustoconical surface of the second end.

16. The quick-connect anchor of claims 14 or 15 wherein the cavity in the casing has a first diameter at the first end of the casing, a second diameter at the second end of the casing different from the first diameter, and a third diameter between the first and second diameter in the casing, different from the first and second diameter.

17. The quick-connect anchor of claim 16 wherein a first frustoconical surface transitions the first diameter to the third diameter of the cavity, and a second frustoconical surface transitions the third diameter to the second diameter of the cavity in the casing.

18. The quick-connect anchor of claim 17 wherein each arcuate internally threaded segment has an annular head portion at the first end, with the frustoconical surface underneath the head portion engaging the first frustoconical surface in the cavity, and the frustoconical surface at the second end of the internally threaded segment engaging the second frustoconical surface in the cavity.

19. The quick-connect anchor of claim 17 further comprising slots in the cavity wall of the casing between the first end and the first frustoconical surface to receive the respective tabs from the internally threaded segments.

20. The quick-connect anchor of claim 17 further comprising at least one tab on the second frustoconical surface of the cavity to engage the teeth in the internally threaded segments.

21. An anchor kit for use in a concrete slab poured over a deck, containing a quick-connect anchor for accepting threaded rod of different diameters, once encapsulated by concrete poured on the deck, the kit comprising:
a quick connect anchor having:
a casing adaptable for attachment to the deck, the casing sized to allow at least about a 1 inch concrete layer on top of the encapsulated anchor, the casing having a first end and a second end, a head closing the first end and an opening of a predetermined diameter at the second end, a cavity in the casing extending from the first end to the second end, the casing having a diameter larger that the diameter of the opening at the second end of the casing;
a plurality of separate arcuate internally threaded segments captured in the cavity of the casing, each segment capable of independent axial movement in the casing, each segment having a first end and a second end, the second end of each segment located closest to the open second end of the casing, each segment having at least two different diameter thread portions along its length, a larger diameter thread portion at the second end of each segment and a smaller diameter thread portion at the first end of each segment;
a spring in the cavity of the casing between the head at the closed first end of the casing and the first end of the plurality of arcuate internally threaded segments; and
a threaded rod of a predetermined length having a first end and a second end and a diameter smaller than the diameter of the opening in the second end of the anchor casing, the diameter of the rod matching the diameter of one of the thread portions of the segments in the casing, the threaded rod having a visual marker comprising a marked predetermined distance from the first end, and an authentication tag, whereby on full insertion of the rod into the casing, the visual marker disappears from view and only the authentication tag is visible.

22. The quick-connect anchor kit of claim 21 further comprising:
a plate located on the casing of the anchor for holding the anchor to a metal deck before concrete is poured, with the second open end of the anchor casing located at an aperture in the metal deck, and a plastic sleeve located on the anchor casing below the plate, having a first end and a second end with collapsible fingers at an open first end and an aperture at the second end.

23. The quick-connect anchor kit of claim 21 further comprising:
the anchor having a sleeve with a boss attached to the exterior of the anchor casing at the second end, the sleeve having an opening at the second end of the anchor casing, and a plurality of nails, held by the boss on the sleeve with the heads of the nails located underneath the head of the anchor casing at the closed first end, the nails attaching the second end of the anchor casing to a wood deck.

24. A suspension kit for utilities or conduit for use with a concrete slab poured over a deck containing quick-connect anchors for accepting threaded rod of different diameters once the anchors are encapsulated by concrete, the kit comprising:
A. a plurality of quick-connect anchors, each anchor having:
(a) a casing adaptable for attachment to the deck, the casing sized to allow at least about a 1 inch concrete layer on top of the encapsulated anchor, the casing having a first end and a second end, a head closing the first end and an opening of a predetermined diameter at the second end, a cavity in the casing extending from the first end to the second end, the casing having a diameter larger than the diameter of the opening at the second end of the casing;
(b) a plurality of separate arcuate internally threaded segments captured in the cavity of the casing, each segment adapted for independent axial movement in the casing, each segment having a first end and a second end, the second end of each segment located closest to the open second end of the casing, each segment having at least two different diameter thread portions along its length, a larger diameter thread portion at the second end of each segment and a smaller diameter thread portion at the first end of each segment;
(c) a spring in the cavity of the casing between the head at the closed first end of the casing and the first end of the plurality of arcuate internally threaded segments; and
B. a suspension assembly having:
(a) at least two threaded rods of a predetermined length, each rod having a first end and a second end and a diameter smaller than the diameter of the opening in the second end of the anchor casing, the diameter of the rod matching the diameter of one of the thread portions of the segments in the casing, the threaded rod having a visual marker comprising a marked predetermined distance from the first end, and an authentication tag, whereby on full insertion of the rod into the casing, the visual marker disappears from view and only the authentication tag is visible; and
(b) at least one support bracket fastened to the at least two threaded rods at their respective second ends to form a support platform for utilities or conduit,
whereby the support bracket is suspended from the concrete slab by inserting the first ends of the threaded rods into respective quick-connect anchors in the concrete slab and pushing vertically upward to obtain full engagement of all the threaded rods, as indicated by disappearance of the visual marker.

25. The suspension kit of claim 24 further comprising:
each anchor in the kit having a plate located on the casing of the anchor for holding the anchor to a metal deck before concrete is poured, with the second end of the anchor casing located at an aperture in the metal deck, and a plastic sleeve located on the anchor casing below the plate, having a first end and a second end with collapsible fingers at an open first end and an aperture at the second end.

26. The suspension kit of claim 24, further comprising:
each anchor in the kit having a sleeve with a boss attached to the exterior of the anchor casing at the second end, the sleeve having an opening at the second end of the anchor casing, and a plurality of nails, held by the boss on the sleeve, with the heads of the nails located underneath the head of the anchor casing at the closed end, the nails adapted for attaching the second end of the anchor casing to a wood deck.

* * * * *